(12) United States Patent
Shirokura et al.

(10) Patent No.: US 7,532,593 B2
(45) Date of Patent: May 12, 2009

(54) RADIO LAN SYSTEM, DIVERSITY APPARATUS, AND RADIO LAN TERMINAL

(75) Inventors: Yoshihiko Shirokura, Tokyo (JP); Toshiaki Tomisawa, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 335 days.

(21) Appl. No.: 10/566,435

(22) PCT Filed: Jun. 25, 2004

(86) PCT No.: PCT/JP2004/009359

§ 371 (c)(1), (2), (4) Date: Jan. 31, 2006

(87) PCT Pub. No.: WO2006/001072

PCT Pub. Date: Jan. 5, 2006

(65) Prior Publication Data

US 2006/0215594 A1    Sep. 28, 2006

(51) Int. Cl.
*H04W 4/00* (2006.01)
*H04W 40/00* (2006.01)
*H04B 7/00* (2006.01)
*H04M 1/00* (2006.01)

(52) U.S. Cl. .............. 370/328; 370/329; 370/338; 370/341; 370/401; 455/445; 455/524; 455/550.1; 455/554.2; 455/556.2; 455/561

(58) Field of Classification Search .......... 455/7–10, 455/11.1, 13.1, 15–18, 20–22, 62, 66.1, 101–103, 455/403, 422.1, 424–425, 426.1–426.2, 445–446, 455/524–526, 550.1, 554.1–554.2, 555, 556.1–556.2, 455/560–561, 13, 59, 63.1–63.2, 65, 67.13, 455/68, 70, 74, 74.1, 88, 41.2, 105, 428, 455/439, 450, 453, 465, 557; 370/218, 226, 370/279, 293, 315–316, 328–329, 338–341, 370/352–357, 395.52–395.53, 473, 492, 370/501, 901, 908–913, 231, 235–236, 238, 370/310, 313, 349–351, 355–356, 392–393, 370/395.2–395.21, 395.3–395.32, 395.4–395.43, 370/395.5–395.54, 400–401, 408–409, 411–412, 370/428; 375/211–212, 214, 267, 299, 346–352; 710/307–312; 713/151–153; 709/238–244

See application file for complete search history.

(56) References Cited

U.S. PATENT DOCUMENTS

| | | | |
|---|---|---|---|
| 6,728,541 B2 * | 4/2004 | Ohkura et al. ............. 455/445 |
| 6,862,448 B1 * | 3/2005 | Bims ....................... 455/432.1 |
| 7,103,669 B2 * | 9/2006 | Apostolopoulos .......... 709/231 |
| 7,272,108 B2 * | 9/2007 | Li et al. ..................... 370/203 |
| 7,280,842 B2 * | 10/2007 | Smolyar et al. ............ 455/525 |
| 2001/0026541 A1 | 10/2001 | You et al. |
| 2002/0105926 A1 | 8/2002 | Famolari et al. |
| 2002/0172184 A1 * | 11/2002 | Kim et al. ................... 370/344 |
| 2002/0191561 A1 | 12/2002 | Chen et al. |
| 2002/0196753 A1 | 12/2002 | Famolari |
| 2004/0101037 A1 * | 5/2004 | Meng ......................... 375/220 |
| 2004/0110469 A1 * | 6/2004 | Judd et al. .................. 455/15 |
| 2005/0058087 A1 * | 3/2005 | Beach et al. ................ 370/257 |

FOREIGN PATENT DOCUMENTS

| | | |
|---|---|---|
| JP | 62-101133 A | 5/1987 |
| JP | 10-41923 A | 2/1998 |

| | | | |
|---|---|---|---|
| JP | 2001-45068 A | 2/2001 | |
| JP | 2003-110498 A | 4/2003 | |

OTHER PUBLICATIONS

IEEE 802.11 Wireless LAN Medium Access Control (MAC) and Physical Layer (PHY) Specifications, 1999.

"802.11 High-speed Wireless LAN Textbook" Hideaki Matsue and Masahiro Morikura, Mar. 29, 2003, p. 49 to 51 and p. 84.

* cited by examiner

*Primary Examiner*—Meless N Zewdu
(74) *Attorney, Agent, or Firm*—Birch, Stewart, Kolasch & Birch, LLP

(57) ABSTRACT

A wireless LAN system includes at least one LAN terminal wirelessly connected to a plurality of base stations, at least one IP terminal connected to an IP network, and a diversity device connected to the IP network and that relays packet transmission between the LAN terminal and the IP terminal via the IP network. The LAN terminal sequentially establishes association with a predetermined number of the base stations, and a plurality of data is transmitted parallelly via the predetermined number of the base stations, between the LAN terminal and the diversity device. At the receiving end, one of the plurality of data is selected and output.

12 Claims, 8 Drawing Sheets

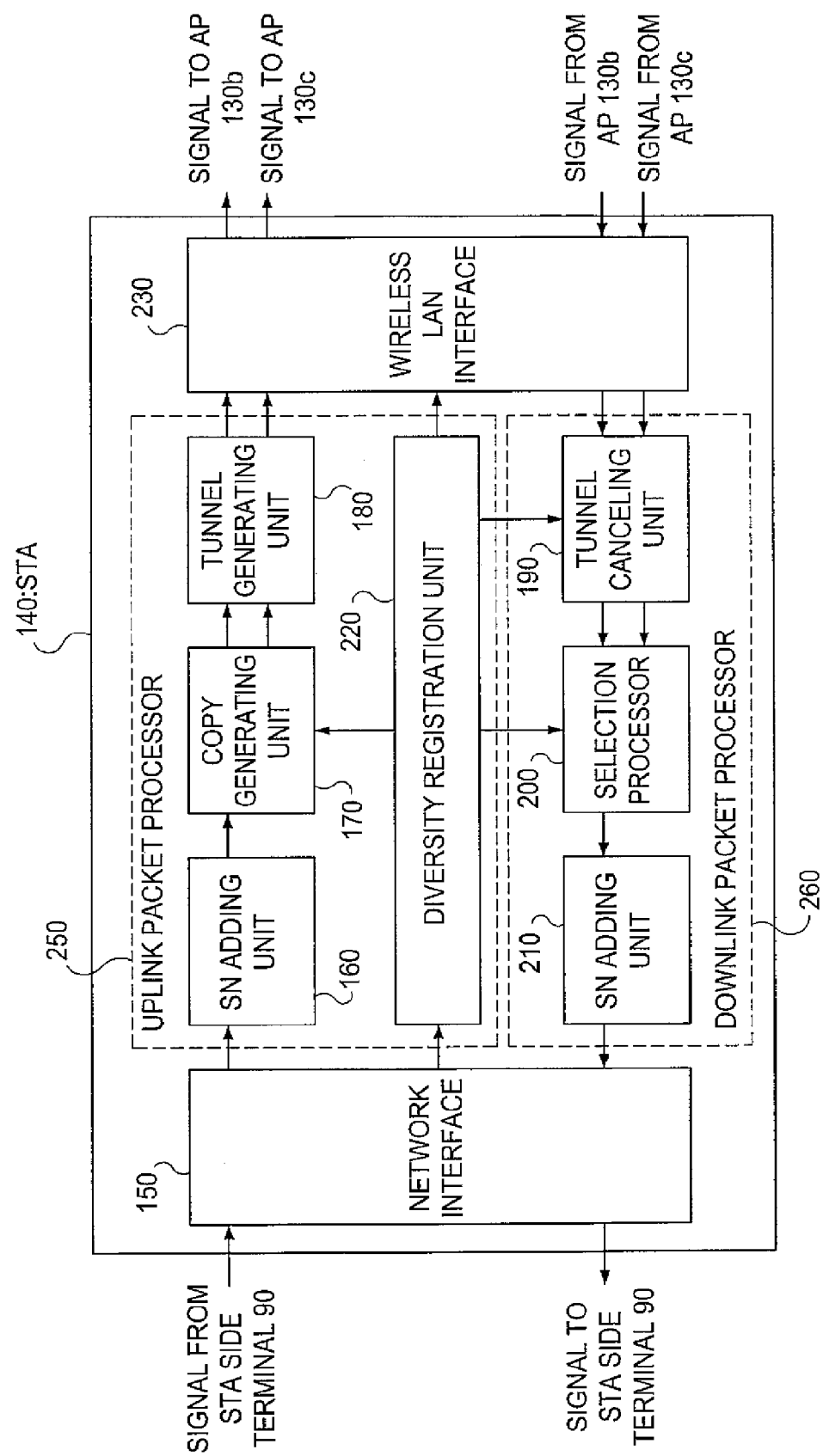

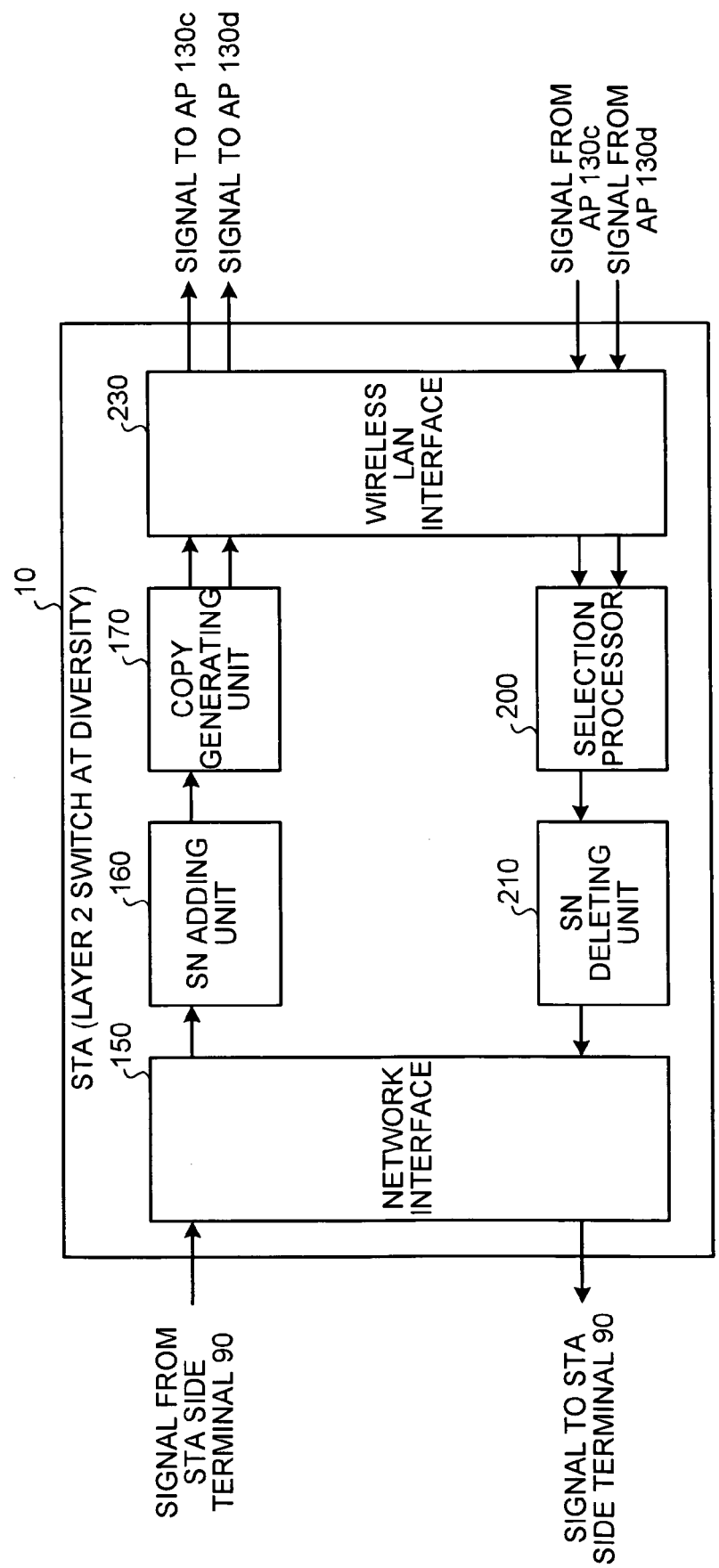

RADIO LAN SYSTEM, DIVERSITY APPARATUS, AND RADIO LAN TERMINAL

TECHNICAL FIELD

The present invention relates to a wireless LAN system, including a plurality of wireless LAN base stations, a wireless LAN terminal wirelessly connected to these wireless LAN base stations, and a diversity device connected to the wireless LAN base stations via an IP network, for relaying packet transfer between a terminal on the IP network and the wireless LAN terminal.

BACKGROUND ART

With the popularization of the Internet, private Local Area Networks (LAN) in houses and buildings are being set up using wireless communication. The wireless LAN conforms to a physical layer and a MAC layer specified in the IEEE 802.11, and realizes multiplexing of multi-users by access control based on the Carrier Sense Multiple Access with Collision Avoidance (CMSA/CA), method (for example, see Non-patent literatures 1 and 2).

In such a conventional wireless LAN system, multi-point wireless connection of maximum 54 Mbps is realized through the physical layer and the MAC layer specified in the IEEE 802.11. However, to realize the wireless connection of 54 Mbps, it is necessary that the transmission distance is short, and that there are minimum wireless deterioration factors. In reality, the transmission distance can be long, and there are wireless deterioration factors, such as reflection on the wall.

To handle this problem, Non-patent Literature 1 and 2 disclose an automatic adjusting function with a plurality of different transmission rates. In other words, when the transmission distance is long, or when there is a wireless deterioration factor, the transmission rate is reduced to 48 (Mbps), 36, 24, 16, . . . , to secure the wireless connection.

Furthermore, the conventional wireless LAN discloses in the Non-patent literature 1 and 2, that there is a handover function for searching a wireless LAN base station (hereinafter, "AP") at the destination and reconnecting the terminal and the AP, in the case of moving a wireless terminal.

Non-patent literature 1: IEEE 802.11 Wireless LAN Medium Access Control (MAC) and Physical Layer (PHY) Specifications 1999 Edition Non-patent literature 2: Hideaki MATSUE and Masahiro MORIKURA, "802.11 High-speed Wireless LAN Textbook", IDC Japan, Mar. 29, 2003, P. 49 to 51, and P. 84

In the conventional techniques, it is attempted to handle the long distance communication and wireless deterioration factors by reducing the transmission rate. Hence, there is a problem in that high-speed transmission cannot be realized in long distance communication, and under bad wireless conditions.

Furthermore, in the conventional wireless LAN, the handover function is provided, but can be used only for semi-fixed use, such as a Notebook PC used in an office is also used in a meeting room. If the wireless LAN is used while moving at a high speed, the handover time increases, thereby making a data interruption time long.

In view of the above problems, it is an object of the present invention to provide a wireless LAN system, a diversity device, and a wireless LAN terminal that can realize high-speed transmission and ensure a low error rate, even under bad wireless conditions and in long distance communication.

It is another object of the present invention to provide a wireless LAN system, a diversity device, and a wireless LAN terminal that can reduce the time of temporary disconnection at the time of handover, when the wireless LAN terminal moves between the wireless LAN base stations.

DISCLOSURE OF INVENTION

A wireless LAN system including a plurality of wireless LAN base stations, a wireless LAN terminal wirelessly connected to the wireless LAN base stations, and a diversity device that relays packet transmission between a terminal on an IP network connected thereto and the wireless LAN terminal, where the wireless LAN terminal includes a first uplink packet processor that sequentially establishes association with the wireless LAN base stations, and transmits a plurality of same uplink packets to the diversity device in parallel via the association-established wireless LAN base stations, the diversity device includes a second uplink packet processor that alternatively selects the received same uplink packets and transmits the selected uplink packet to the terminal on the IP network; and a first downlink packet processor that creates a plurality of same downlink packets from a downlink packet from the terminal on the IP network, and transmits the created same downlink packets to the wireless LAN terminal in parallel via the wireless LAN base stations with which the association has been established, and the wireless LAN terminal includes a second downlink packet processor that selects and outputs one of the same downlink packets from the diversity device received via the wireless LAN base stations.

According to the present invention, when communication is carried out between the wireless LAN terminal and a terminal on the IP network, the wireless LAN terminal sequentially establishes association with the wireless LAN base stations, and after the association has been established, parallel communication is carried out between the wireless LAN terminal and the diversity device via the wireless LAN base stations, and one of the parallel communication data received by the wireless LAN terminal and the diversity device is selected and output.

Accordingly, even under bad wireless conditions, high-speed transmission can be realized and low error rate can be ensured. Furthermore, even when the wireless LAN is applied to high-speed access in trains or vehicles moving at a high speed, high-speed transmission can be realized and a low error rate can be ensured. Furthermore, the time of temporary disconnection at the time of handover can be reduced, when the wireless LAN terminal moves between the wireless LAN base stations.

BRIEF DESCRIPTION OF DRAWINGS

FIG. 2A is a block diagram illustrating an exemplary embodiment in which elements of the STA in FIG. 2 are arranged according to an uplink packet processor and a downlink packet processor; FIG. 8 is a block diagram of an internal configuration of an STA used in the system according to the sixth embodiment.

BEST MODE(S) FOR CARRYING OUT THE INVENTION

Exemplary embodiments of the present invention will be explained below in detail, with reference to the accompanying drawings.

Figure 1:
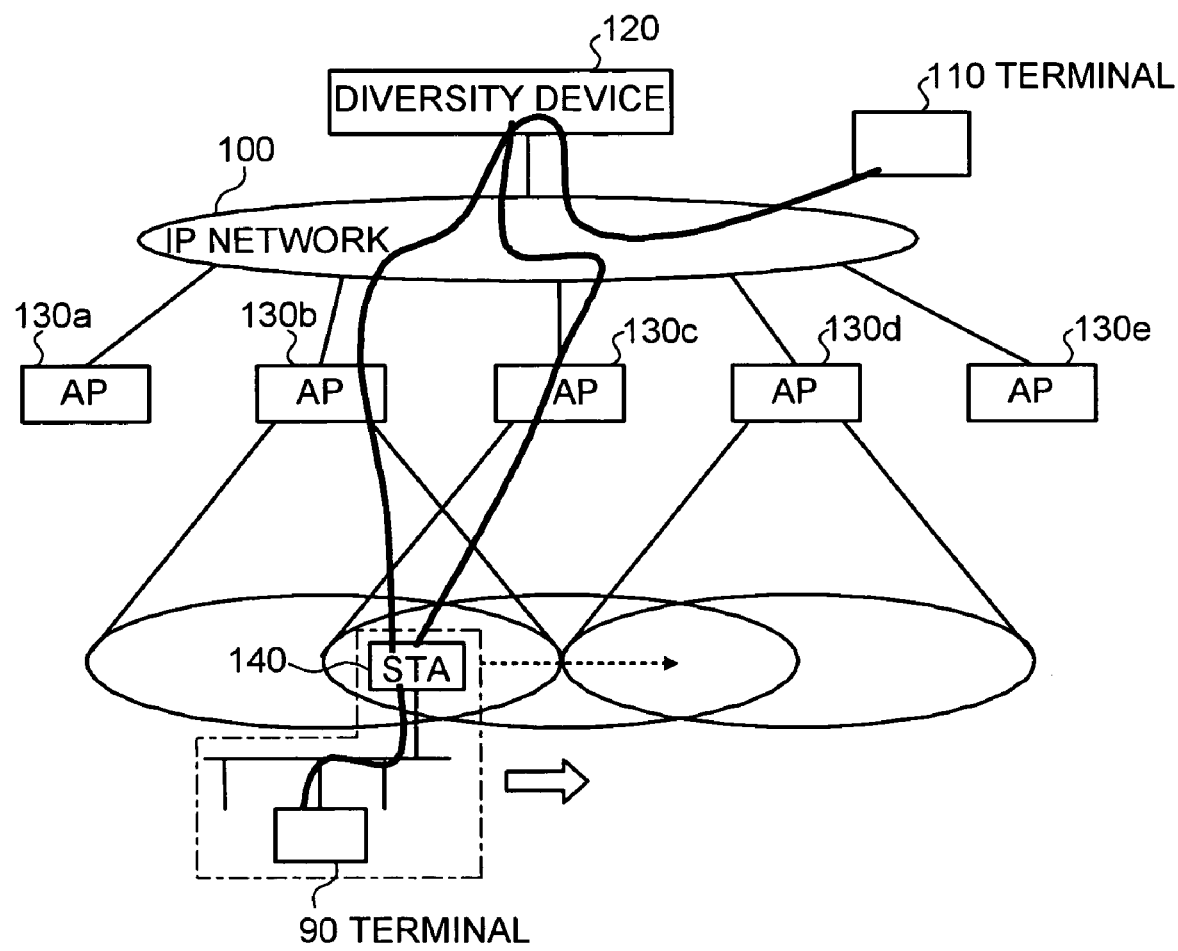
FIG. 1 is a system configuration of a wireless LAN system according to a first embodiment of the present invention.

A first embodiment of the present invention will be explained with reference to FIGS. 1 to 4. FIG. 1 is a system configuration of a wireless LAN system according to the present invention. In the wireless LAN system shown in FIG. 1, a plurality (in this case, five) of wireless LAN base stations (hereinafter, "AP") 130a to 130e, a diversity device 120, and a terminal device 110 (hereinafter, "network terminal") are connected to an IP network 100. The network terminal 110 is a fixed terminal, such as a web server.

A wireless LAN terminal (hereinafter, "STA") 140 is wirelessly connected to the APs 130a to 130e. The STA 140 is a wireless transmitter receiver forming the wireless LAN together with the APs 130a to 130e, and under supervision of the STA 140, one or a plurality of user terminal devices 90, such as personal computers, are connected to the STA 140 via a cable, for example. The STA 140 and the user terminal devices 90 move in a unified manner. In this case, a wide area wireless LAN is assumed, in which the STA 140 is mounted to a mobile body such as trains or vehicles, and one or a plurality of user terminal devices 90 (hereinafter, "STA side terminal") is mounted to the mobile body.

It is desired to arrange cells so that the respective positions to which the STA 140 moves are covered by the APs in order to perform the diversity operation of the present invention. In FIG. 1, there is one STA 140 and one network terminal 110 for convenience, but these are provided in a plurality of numbers in practice.

In the first embodiment, the communication between the STA side terminal 90 and the network terminal 110 is assumed.

The diversity device 120 has a function of relaying packet transfer between the network terminal 110 and the STA side terminal 90, and executes network diversity operation in association with the STA 140. The outline of the network diversity operation (hereinafter, "diversity operation") will be explained below.

When a packet is transmitted from the STA side terminal 90 to the network terminal 110, the STA 140 establishes association with the APs and transmits the same packets to the diversity device 120 as a repeater, in parallel, via the APs. Upon reception of a plurality of packets via the APs, the diversity device 120 selects one packet and transmits it to the network terminal 110.

Upon reception of a packet sent from the network terminal 110 to the STA side terminal 90, the diversity device 120 transmits the same packets to the STA 140 in parallel via the APs with which the association has been established. Upon reception of the packets via the APs, the STA 140 selects one packet and transmits it to the STA side terminal 90.

Figure 2:
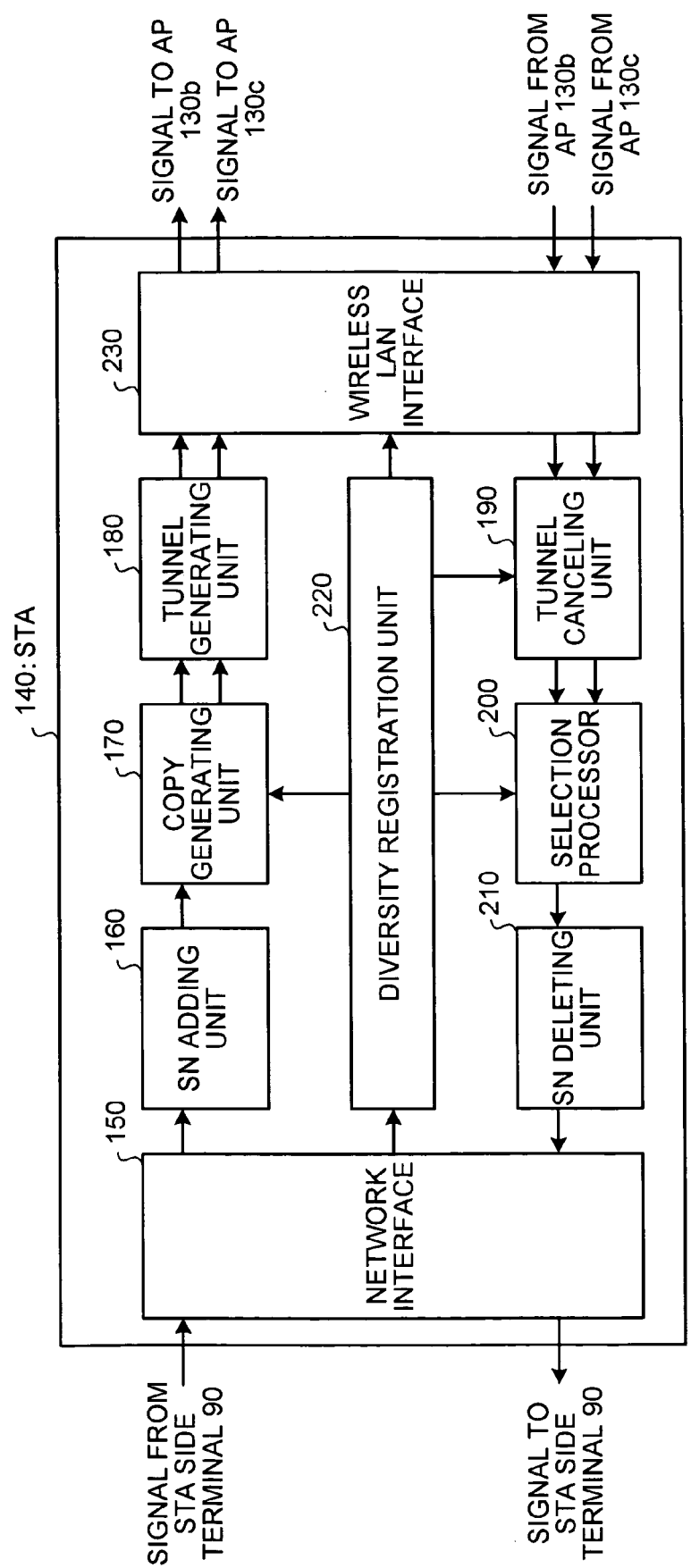
FIG. 2 is a block diagram of an internal configuration of an STA used in the system according to the first embodiment.

FIG. 2 is a block diagram of an internal configuration of the STA 140. As shown in FIG. 2, the STA 140 includes a network interface 150, a sequence number adding unit (SN adding unit) 160, a copy generating unit 170, a tunnel generating unit 180, a tunnel canceling unit 190, a selection processor 200, a sequence number deleting unit (SN deleting unit) 210, a diversity registration unit 220, and a wireless LAN interface (IF) 230. In the STA in FIG. 2, an instance is shown in which diversity operation for multiple connections to two APs 130b and 130c shown in FIG. 1 is performed.

The network IF 150 has a transfer interface function with the network that is under the supervision of the STA 140. After receiving an uplink packet from the STA side terminal 90, the network IF 150 sends the uplink packet to the SN adding unit 160. Furthermore, the network IF 150 transmits a downlink packet sent by the SN deleting unit 210 to the STA side terminal 90.

The diversity registration unit 220 searches for APs in the periphery via the wireless LAN IF 230, and sequentially selects a predetermined number of APs to be multiply connected (in this case, the two APs 130b and 130c). Every time when the association is established, The diversity registration unit 220 sends out to the diversity device 120, a diversity registration request that includes a plurality of IP addresses corresponding to IP tunnels to be used by the STA and the like, via each of the APs 130b and 130c. The respective diversity registration requests may also include an IP address of STA side terminal 90 or a network prefix under the supervision of the STA. When the association with the predetermined number of (in this case, two) APs has been established, the diversity registration unit 220 registers the diversity registration request for a plurality of paths selected by the own device, that is, the diversity registration request transmitted to the diversity device 120, in the own device, and also starts the operation of a transfer system constituted by other components in the STA 140. The method of multiple connections to the APs in the wireless LAN between the STA 140 and the APs can be one sharing the same frequency according to CSMA/CA, or one using an individual frequency for each wireless link.

Every time when the STA 140 receives a packet from the STA side terminal 90, the SN adding unit 160 adds a sequence number to the packet, which is updated by "1" every time, and sends the packet with the sequence number to the copy generating unit 170.

The copy generating unit 170 copies the packet with the sequence number added, by the number instructed by the diversity registration unit 220 (the number of multiple connections) and sends the copied packets to the tunnel generating unit 180. All the copied packets have the same sequence number. In this case, because the diversity operation is performed via two APs, two packets are sent to the tunnel generating unit 180.

The tunnel generating unit 180 builds an IP tunnel to the diversity device 120 for the packets received from the copy generating unit 170. That is, the tunnel generating unit 180 creates a header including the IP address of the pre-registered diversity device 120, and adds the header to the packets, to encapsulate the packets. The packets encapsulated in an IP tunnel mode are sent to the wireless LAN IF 230.

The wireless LAN IF 230 sends out respective packets to the wireless LAN link corresponding to the diversity information instructed by the diversity registration unit 220, to thereby wirelessly transmit the uplink packet to the necessary APs (in this case, the APs 130b and 130c). The diversity information can be notified to the wireless LAN IF 230 via the tunnel generating unit 180.

According to an exemplary embodiment, the various operations for processing the uplink packets which are performed by the diversity registration unit 220, the SN adding unit 160, the copy generating unit 170, and tunnel generating unit 180 may be implemented within an uplink packet processor 250 as shown in FIG. 2A. However, such operations may be implemented according to other arrangements of hardware, software, and/or firmware as will be contemplated by those of ordinary skill in the art.

On the other hand, the wireless LAN IF 230 sends the downlink packets from the network terminal 110, received via the diversity device 120 and the APs 130*b* and 130*c,* to the tunnel canceling unit 190. The diversity device 120 builds the IP tunnel to the STA 140 for the packets received via the APs 130*b* and 130*c* as described below. That is, the diversity device 120 uses the headers that include a plurality of IP addresses to be used by the STA 140, which are included in the diversity registration request transmitted from the STA 140, to encapsulate the downlink packet from the network terminal 110.

The diversity registration unit 220 notifies the tunnel canceling unit 190 of information such as the IP addresses used by the STA. The tunnel canceling unit 190 uses the information to cancel the IP tunnel of the packets encapsulated in the IP tunnel mode, which have been received from a plurality of paths, and decapsulates the respective packets.

The selection processor 200 checks the sequence number of the decapsulated packets, and when a plurality of packets having the same sequence number is received, selects one of them, and sends the selected packet to the SN deleting unit 210. If only one packet is received due to an error or the like in the wireless section, the selection processor 200 selects and outputs the packet.

The SN deleting unit 210 deletes the sequence number from the packet received from the selection processor 200, and sends the packet to the network IF 150.

According to an exemplary embodiment, the various operations for processing the downlink packets which are performed by the tunnel cancelling unit 190, the selection processor 200, and the SN detecting unit 210 may be implemented within a downlink packet processor 260 as shown in FIG. 2A. However, such operations may be implemented according to other arrangements of hardware, software, and/or firmware as will be contemplated by those of ordinary skill in the art.

Figure 3:
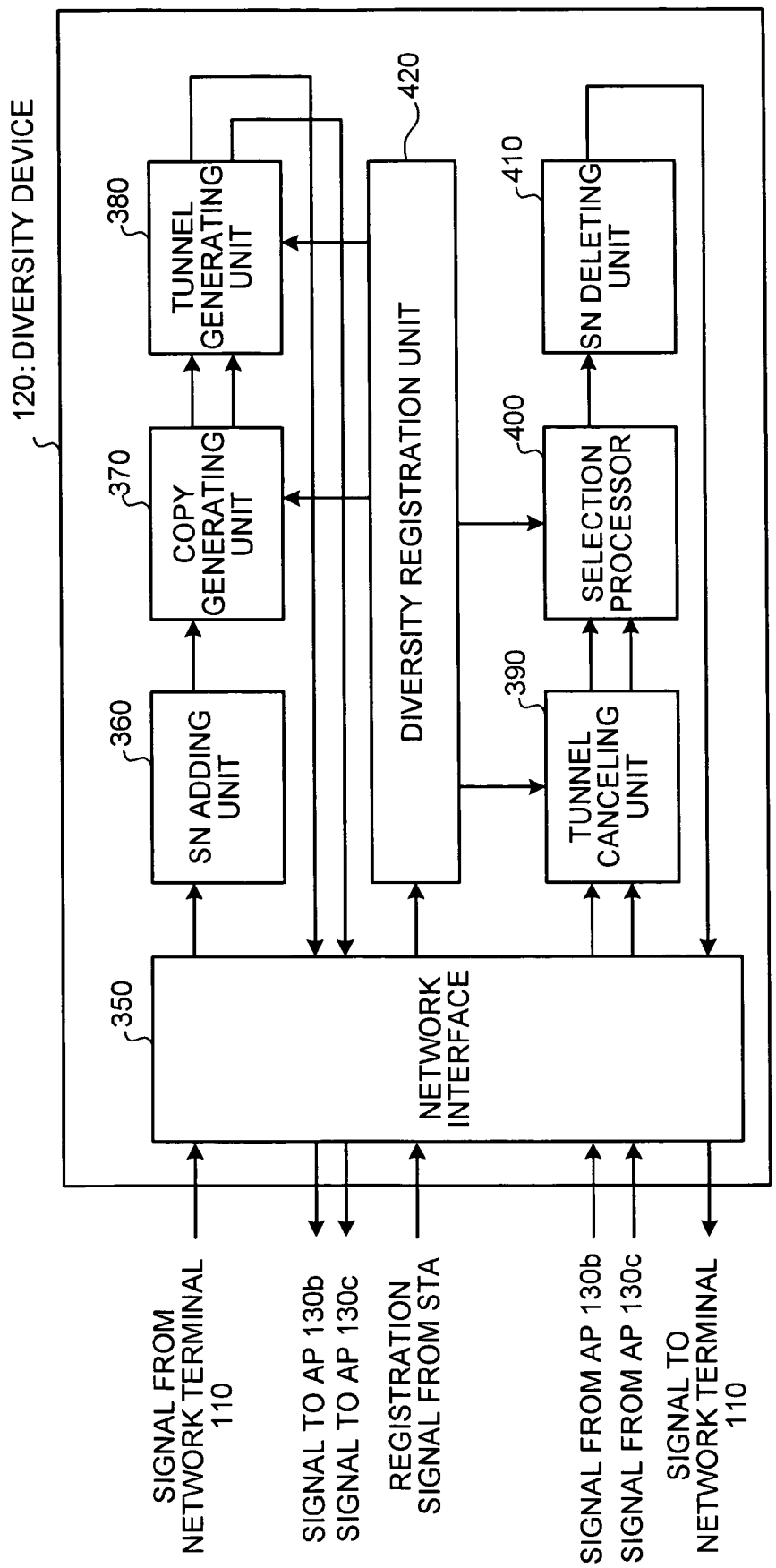
FIG. 3 is a block diagram of an internal configuration of a diversity device used in the system according to the first embodiment.

FIG. 3 is a block diagram of an internal configuration of the diversity device 120. As shown in FIG. 3, the diversity device 120 includes a network interface 350, a sequence number adding unit (SN adding unit) 360, a copy generating unit 370, a tunnel generating unit 380, a tunnel canceling unit 390, a selection processor 400, a sequence number deleting unit (SN deleting unit) 410, and a diversity registration unit 420. In the diversity device 120 in FIG. 3, such an instance is shown that diversity operation for multiple connections to the two APs 130*b* and 130*c* shown in FIG. 1 is performed.

The network IF 350 has a transfer interface function with the IP network 100. After receiving a downlink packet from the network terminal 110 via the IP network 100, the network IF 350 sends the downlink packet to the SN adding unit 360. Furthermore, the network IF 350 transmits a plurality of (in this case, two) downlink packets, received from the tunnel generating unit 380, to a plurality of necessary APs (in this case, the APs 130*b* and 130*c*). Furthermore, the network IF 350 sends various registration data included in the diversity registration request received from the STA 140, to the diversity registration unit 420. The network IF 350 further sends an uplink packet from the APs (in this case, the APs 130*b* and 130*c*) to the tunnel canceling unit 390, and transmits the uplink packet received from the SN deleting unit 410 to the network terminal 110.

The diversity registration unit 420 registers various registration data that are included in the diversity registration request from the STA 140 and that are input by the network IF 350. The registration data includes the number of multiple connections (in this case, two), the IP addresses of the STA 140 used for the IP tunnel, and the IP address of the STA side terminal 90, or the network prefix under the supervision of the STA.

Every time when the SN adding unit 360 receives a packet from the network terminal 110 on the IP network 100, the SN adding unit 360 adds a sequence number to the packet, which is updated by "1" every time, and sends the packet with the sequence number to the copy generating unit 370.

Figure 4A:
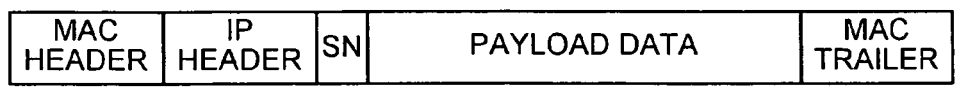
FIG. 4 depict the configuration of a packet with a sequence number added thereto.
Figure 4B:

FIG. 4A depicts an IP packet with a sequence number SN, when a router such as a layer 3 home agent (HA) is adopted as the diversity device 120, and the sequence number SN is added immediately after the IP header. FIG. 4B depicts an IP packet with a sequence number SN, when a layer 2 switch is adopted as the diversity device 120, and the sequence number SN is added immediately after the MAC header.

The copy generating unit 370 copies the packet with the sequence number by the number instructed from the diversity registration unit 420 (=the number of multiple connections), and sends the copied packets to the tunnel generating unit 380. All the copied packets have the same sequence number. In this case, because the diversity operation is performed via two APs, two packets are sent to the tunnel generating unit 380.

The tunnel generating unit 380 builds an IP tunnel to the STA 140 for the packets received from the copy generating unit 370. That is, the tunnel generating unit 380 uses the IP addresses used by the STA 140 and that are included in the registration data in the diversity registration unit 420, to create a plurality of headers, and adds the headers to the packets, to encapsulate the packets. In this case, because two packets are input to the tunnel generating unit 380, a header including a different IP address is added to each of the packets, and the packets are sent to the network IF 350.

The tunnel canceling unit 390 uses the information of the IP address used by the diversity device 120 and the like, which is notified from the diversity registration unit 420, to cancel the IP tunnel for the packets received from a plurality of paths, and decapsulates the respective packets.

The selection processor 400 checks the sequence number of the decapsulated packets, and when a plurality of packets having the same sequence number is received, selects one of them, and sends the selected packet to the SN deleting unit 410. If only one packet is received due to an error or the like in the wireless section, the selection processor 400 selects and outputs the packet.

The SN deleting unit 410 deletes the sequence number from the packet received from the selection processor 400, and sends the packet to the network IF 350.

The operation in the present invention will be explained next. An example in which the STA 140 is multiply connected to two APs 130*b* and 130*c* will be explained. The operation is the same even if the STA 140 is multiply connected to two or more APs.

The diversity registration unit 220 in the STA 140 searches APs in the periphery via the wireless LAN IF 230 and after having determined one AP, establishes association with the AP (in this case, AP 130*b*). After having established the association with the AP 130*b,* the diversity registration unit 220 sends out a diversity registration request to the diversity device 120 via the AP 130*b.* The diversity registration request includes a first IP address used by the STA, and the address of the STA side terminal 90 or a network prefix under the supervision of the STA.

The diversity registration unit 220 in the STA 140 further searches APs in the periphery, selects an AP to be connected next (in this case, AP 130c), and establishes the second association with the AP 130c. After having established the second association with the AP 130c, the diversity registration unit 220 sends out a diversity registration request including a second IP address used by the STA, and the address of the STA side terminal 90 or a network prefix under the supervision of the STA, to the diversity device 120.

In this manner, after the predetermined number of multiple connections (in this case, two) has been established, the diversity registration unit 220 registers the diversity registration request for a plurality of paths selected by the own device, that is, the diversity registration request transmitted to the diversity device 120, in the own device (the diversity registration unit 220), and also initiates the operation of the transfer system constituted by other components in the STA 140, that is, copy process of the uplink packet and selection process of the downlink packet.

The two diversity registration requests are transmitted to the diversity device 120, via the AP 130b and the AP 130c, respectively. The diversity device 120 receives the two diversity registration requests via the network IF 350.

The diversity registration unit 420 in the diversity device 120 registers various registration data included in the two diversity registration requests received from the network IF 350. The registration data includes the number of multiple connections (in this case, two), the IP addresses of the STA 140 used for the IP tunnel, and the IP address of the STA side terminal 90, or the network prefix under the supervision of the STA. Accordingly, the diversity device 120 can recognize the packet addressed to the STA side terminal under the supervision of the STA 140. When the registration process has finished, the diversity device 120 initiates the operation of the transfer system constituted by other components, that is, copy process of the downlink packet and selection process of the uplink packet.

The process of transmitting the downlink packet from the network terminal 110 to the STA side terminal 90 will be explained next.

The SN adding unit 360 in the diversity device 120 adds a sequence number to the packet from the network terminal 110 received by the network IF 350. Subsequently, the copy generating unit 370 copies the packet by the number (in this case, two) instructed by the diversity registration unit 420, and transmits the copied packets to the tunnel generating unit 380. The tunnel generating unit 380 uses the first and the second IP addresses to be used by the STA 140 in the registration data in the diversity registration unit 420, to create two headers including the respective IP address, adds the header to the corresponding packets, thereby generating two IP tunnel packets formed by encapsulating the two packets that were input. The network IF 350 transmits the two generated packets to the corresponding AP 130b and 130c.

Figure 3A:
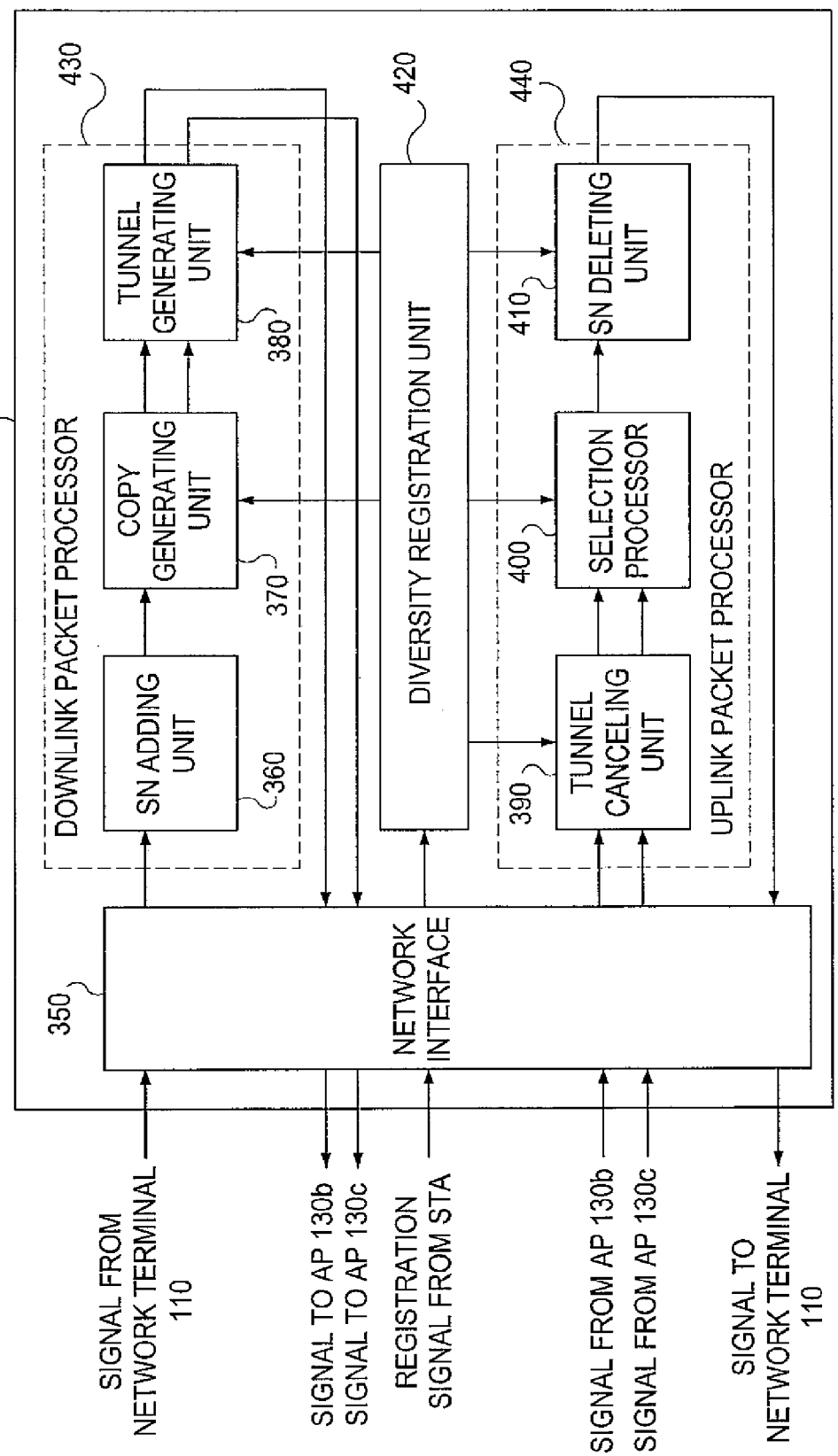
FIG. 3A is a block diagram illustrating an exemplary embodiment in which elements of the diversity device in FIG. 3 are arranged according to an uplink packet processor and a downlink packet processor.

According to an exemplary embodiment, the various operations for processing the downlink packet which are performed by the SN adding unit 360, the copy generating unit 370, and the tunnel generating unit 410 of the diversity device 120 may be implemented within a downlink packet processor 430 as shown in FIG. 3A. However, such operations may be implemented according to other arrangements of hardware, software, and/or firmware as will be contemplated by those of ordinary skill in the art.

The STA 140 receives these two IP tunnel packets wirelessly through separate paths via the two APs 130b and 130c. The STA 140 sends the two packets, received from the two paths via the wireless LAN IF 230, to the tunnel canceling unit 190. The information such as the first and the second IP addresses to be used by the STA has been notified to the tunnel canceling unit 190, and hence, the tunnel canceling unit 190 uses these pieces of information to execute decapsulation process for canceling the IP tunnel for the two packets.

The selection processor 200 checks the sequence number of the decapsulated packets, and when a plurality of packets having the same sequence number is received, selects one of them, and sends the selected packet to the SN deleting unit 210. The SN deleting unit 210 deletes the sequence number from the packet received from the selection processor 200, and sends the packet to the network IF 150. The network IF 150 sends the packet, from which the sequence number has been deleted, to the STA side terminal 90 under the supervision of the STA 140.

The process of transmitting the uplink packet from the STA side terminal 90 to the network terminal 110 will be explained next.

The SN adding unit 160 in the STA 140 adds a sequence number to the packet from the STA side terminal 90 received by the network IF 150. Subsequently, the copy generating unit 170 copies the packet by the number (in this case, two) instructed by the diversity registration unit 220, and transmits the copied packets to the tunnel generating unit 180. The tunnel generating unit 180 generates a header including the pre-registered IP address of the diversity device 120, adds the header to the two packets, and encapsulates the two packets. The two packets encapsulated in the IP tunnel mode are sent to the wireless LAN IF 230. The wireless LAN IF 230 sends out the respective IP tunnel packets to the wireless LAN link corresponding to the diversity information instructed by the diversity registration unit 220, thereby to wirelessly transmit the uplink packet to the two APs 130b and 130c.

The diversity device 120 receives these two IP tunnel packets through separate paths via the two APs 130b and 130c. The diversity device 120 sends the two IP tunnel packets received via the network IF 350 to the tunnel canceling unit 390. The information such as the IP address to be used by the diversity device 120 has been notified to the tunnel canceling unit 390, and hence, the tunnel canceling unit 390 uses the information to execute decapsulation process for canceling the IP tunnel for the two packets.

The selection processor 400 checks the sequence number of the decapsulated packets, and when a plurality of packets having the same sequence number are received, selects one of them, and sends the selected packet to the SN deleting unit 410. The SN deleting unit 410 deletes the sequence number from the packet received from the selection processor 400, and sends it to the network IF 350. The network IF 350 sends out the packet, from which the sequence number has been deleted, to the network terminal 110.

According to an exemplary embodiment, the various operations for processing the uplink packet which are performed by the tunnel cancelling unit 390, the selection processor 400, and the SN deleting unit 410 may be implemented within an uplink packet processor 440 as shown in FIG. 3A. However, such operations may be implemented according to other arrangements of hardware, software, and/or firmware as will be contemplated by those of ordinary skill in the art.

Thus, in the first embodiment, when communication is performed between the STA side terminal 90 and the network terminal 110, the STA 140 sequentially establishes the association with a plurality of APs, and thereafter, a plurality of parallel communication is carried out between the STA 140 and the diversity device 120 via a plurality of APs, and the STA 140 and the diversity device 120 select one of the parallel communication data to send it out to the STA side terminal 90 and the network terminal 110. Accordingly, high-speed transmission can be realized and a low error rate can be ensured, even under bad wireless conditions. Furthermore, even when the wireless LAN is applied to high-speed access in trains or vehicles moving at a high speed, high-speed transmission can be realized and a low error rate can be ensured. Furthermore, when the wireless LAN terminal moves between the wireless LAN base stations, the time of temporary disconnection at the time of handover can be reduced. Since the packet communication is carried out in the IP tunnel mode, packets can be reliably transmitted between the STA and the diversity device. Furthermore, since the sequence number is added to the packet, and the packet is selected by confirming the sequence number, the sequence of the packets cannot be mistaken.

In the first embodiment, an example in which the terminal STA side terminal 90 is under the supervision of the STA 140 has been explained. In the present invention, however, the STA can be a mobile station such as a notebook PC or a PDA having the wireless LAN function.

In a second embodiment, for each sequence number, the selection processor 200 in the STA 140 shown in FIG. 2 performs the selection process in which a first correctly received packet, of a plurality of downlink packets having the same sequence number, is determined as a selected packet, and sent out to the SN deleting unit 210, and all the packets having the same sequence number received thereafter are disposed of.

The selection processor 400 in the diversity device 120 shown in FIG. 3 performs the similar process. That is, for each sequence number, the selection processor 400 performs the selection process in which a first correctly received packet, of a plurality of uplink packets having the same sequence number, is determined as a selected packet, and sent out to the SN deleting unit 410, and all the packets having the same sequence number received thereafter are disposed of.

According to such selection process, a packet delay is reduced, and the circuit configuration can be simplified.

In a third embodiment, the selection processor 200 in the STA 140 shown in FIG. 2 waits for a certain period of time to receive a plurality of downlink packets having the same sequence number, and selects one packet among the one or more packets having the same sequence number received within the certain period of time. In other words, the selection processor 200 saves a first correctly received packet temporarily, waits until the certain period of time has passed, and performs selection process to select one packet out of the packets received within the certain period of time.

The selection processor 400 in the diversity device 120 shown in FIG. 3 performs the similar process. That is, the selection processor 400 waits for a certain period of time to receive a plurality of uplink packets having the same sequence number, and selects one packet among the one or more packets having the same sequence number received within the certain period of time.

According to such selection process, a packet having a low error rate can be selected, thereby improving the data quality.

In a fourth embodiment, the reception side in the wireless communication adds additional information to the packet. The additional information includes any one of the radio status (for example, strength of received signal) and an error check result (for example, CRC error check result and error correction result) or both, at the time of receiving a wireless packet.

In other words, in the case of downlink data, the additional information is added by the wireless LAN IF 230 in the STA 140, and sent out to the selection processor 200. The selection processor 200 selects a packet having good radio status and good error check result, among the packets having the same sequence number. Thereafter, the information of the sequence number, the radio status, and the error check result is appropriately deleted, and the packet is transmitted to the STA side terminal 90.

In the case of the uplink data, the AP adds the additional information to the packet and sends the packet to the diversity device 120. The selection processor 400 in the diversity device 120 selects a packet having good radio status and good error check result, among the packets having the same sequence number. Thereafter, the information of the sequence number, the radio status, and the error check result is appropriately deleted, and the packet is transmitted to the network terminal 110.

Figure 5A:
FIG. 5 depicts the configuration of a packet with a sequence number and received radio wave status information added thereto.
Figure 5B:
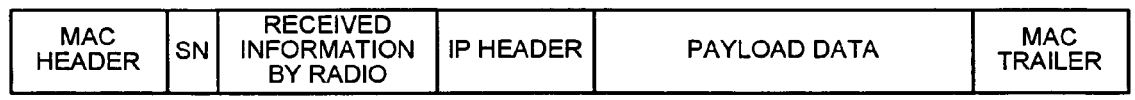

FIG. 5A depicts an IP packet with a sequence number SN and the radio status information, when a router such as a layer 3 home agent (HA) is adopted as the diversity device 120, and the sequence number SN and the radio status information are added immediately after the IP header. FIG. 5B depicts an IP packet with a sequence number SN and the radio status information, when a layer 2 switch is adopted as the diversity device 120, and the sequence number SN and the radio status information are added immediately after the MAC header.

According to the fourth embodiment, a packet having good wireless quality and a low error rate can be reliably selected.

In a fifth embodiment, a Mobile IP home agent (hereinafter, "HA") is used as the diversity device 120. In the Mobile IP, packets from a fixed terminal on the IP network 100 to a mobile terminal always pass through the HA. Therefore, if the function of the diversity device is added to the HA, the packet from the fixed terminal to the mobile terminal can be reliably relayed.

However, in the Mobile IP, the packet from the mobile terminal to the fixed terminal does not pass through the HA, but is directly routed to the fixed terminal. In the present invention, therefore, an IP tunnel from the STA to the HA is generated so that the packet from the mobile terminal to the fixed terminal passes through the HA without fail. In the communication from the mobile terminal to the fixed terminal, the HA cancels the tunnel, and transfers the packet to the fixed terminal.

According to the fifth embodiment, a low-cost diversity device can be realized by diverting a function of an existing apparatus.

Figure 6:
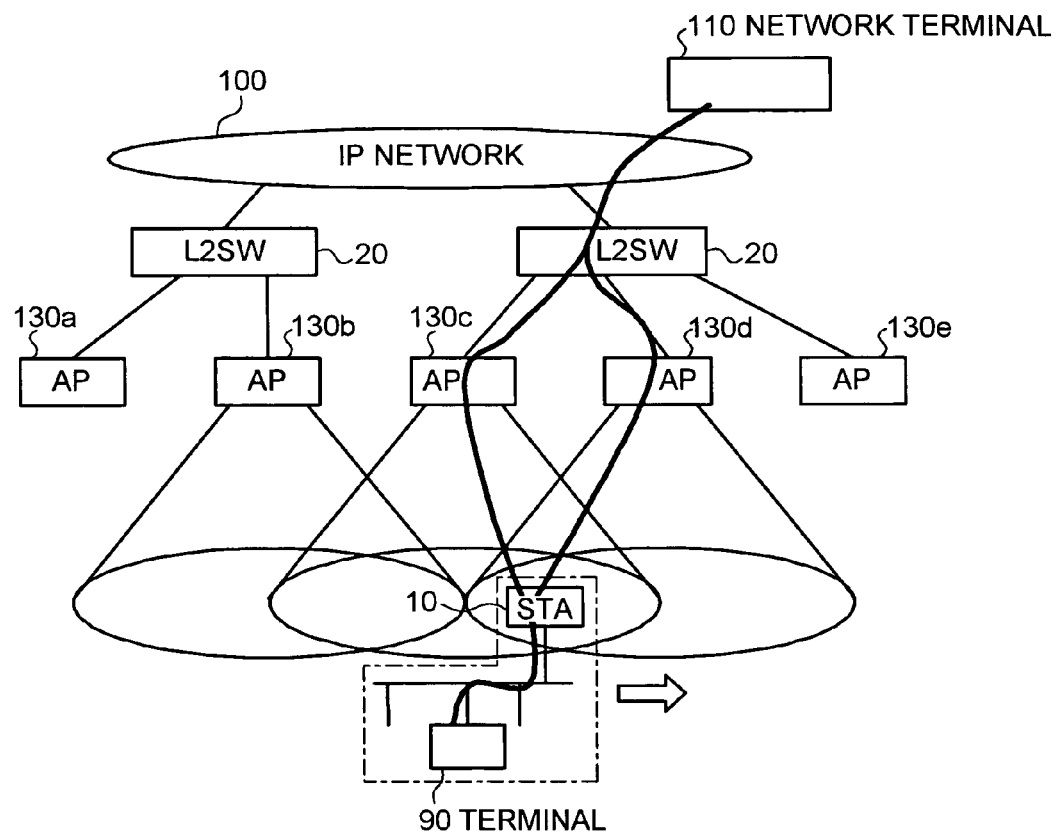
FIG. 6 is a system configuration of a wireless LAN system according to a sixth embodiment of the present invention.
Figure 7:
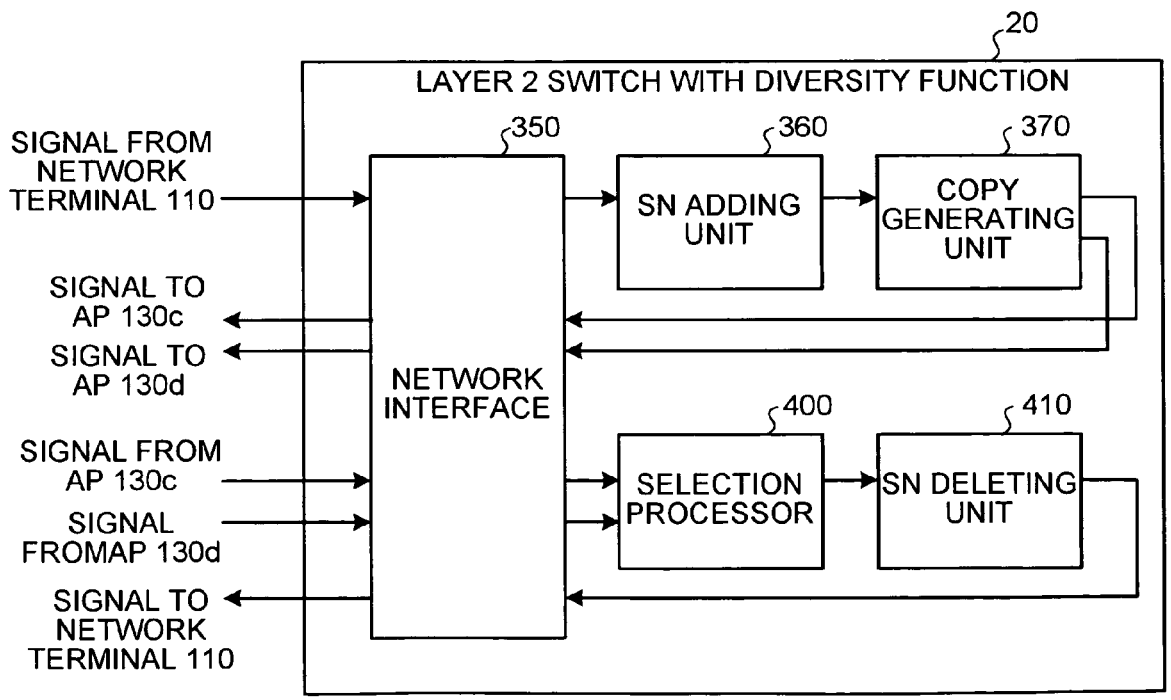
FIG. 7 is a block diagram of an internal configuration of a layer 2 switch used in the system according to the sixth embodiment.

In a sixth embodiment, a layer 2 switch is adopted as the diversity device 120. FIG. 6 is a system diagram when the layer 2 switch is used as the diversity device. FIG. 7 is a block diagram of a layer 2 switch with a network diversity function. FIG. 8 is a block diagram of the STA when the layer 2 switch with the network diversity function is used.

In the wireless LAN system shown in FIG. 6, a plurality of layer 2 switches 20 and a plurality of network terminals 110 are connected to the IP network 100, and a plurality of APs 130a to 130e are connected to the layer 2 switches 20 under the supervision thereof. The remaining configuration is the same as in the wireless LAN system shown in FIG. 1.

The diversity registration unit 420 of the diversity device 120 shown in FIG. 3 is not included in the layer 2 switch 20 shown in FIG. 7. The diversity registration unit 220, the tunnel generating unit 180, and the tunnel canceling unit 190 of the STA 140 shown in FIG. 2 are not included in the STA 10 shown in FIG. 8.

In this case, similar to the earlier case, the layer 2 switch 20 has a function of relaying packet transfer between the network terminal 110 and the STA side terminal 90, and the layer 2 switch 20 executes the network diversity operation in cooperation with the STA 10. However, the IP tunnel used in the system in the first embodiment and the like is not used in this system, because the layer 2 switch is used here. Therefore, one IP address and one MAC address are allocated to the STA 10. The method of multiple connections between the STA 10 and the APs can be one sharing the same frequency according to CSMA/CA, or one using an individual frequency for each wireless link.

According to the layer 2 switch 20 with the diversity function, when one MAC address is learnt at a plurality of ports, packet copy operation is performed for the number of learning with respect to the downlink packet, and the selection process for selecting one packet from packets for the number of learning having the same sequence number is executed with respect to the uplink packet.

In other words, for example, when the STA 10 has established association with two APs, the STA 10 initiates copy generation and selection process, and performs data communication via the two APs. In this case, with the layer 2 switch 20, the MAC address learnt at the port connected to the first AP is also detected at the port connected to the second AP. With the general layer 2 switch 20, learning at the first port is canceled with respect to the corresponding MAC address, and learning is switched to the second port.

In the layer 2 switch 20 with the diversity function of the present invention, therefore, when the same MAC address is detected at a plurality of ports, learning of the MAC address is carried out at each of the ports. In other words, while saving the learning result at the first port, learning is also carried out at the second port.

With the layer 2 switch 20, when one MAC address is learnt at a plurality of ports, packet copy operation is performed for the number of learning with respect to the downlink packet, and the selection process for selecting one packet from the packets for the number of learning having the same sequence number is executed with respect to the uplink packet. Canceling of learning of the MAC address may be performed, for example, using an aging timer that detects that a packet does not arrive for a certain period of time. Alternatively, such a method is used that when the number of copies/selection is 2, the oldest learning is canceled when the same MAC address is detected at the third port.

That is, in this system, with regard to the downlink packet transfer, the SN adding unit 360 in the layer 2 switch 20 adds a sequence number to a packet received from the network terminal 110 through the network IF 350. Subsequently, the copy generating unit 370 copies the packet by the number of ports corresponding to the same MAC address learnt by the network IF 350, and sends the copied packets to the network IF 350. The network IF 350 transmits the generated packets to the corresponding APs 130*c* and 130*d*.

The STA 10 receives these two packets wirelessly through separate paths via the two APs 130*c* and 130*d*. The STA 10 sends the two packets, received through two paths via the wireless LAN IF 230, to the selection processor 200. The selection processor 200 checks the sequence number of the input packets for the number of connected APs, and when a plurality of packets having the same sequence number is received, selects one of them, and sends the selected packet to the SN deleting unit 210. The SN deleting unit 210 deletes the sequence number from the packet received from the selection processor 200, and sends the packet to the network IF 150. The network IF 150 sends the packet, from which the sequence number is deleted, to the STA side terminal 90 under the supervision of the STA 10.

On the other hand, with regard to the uplink packet process, the SN adding unit 160 in the STA 10 adds a sequence number to the packet from the STA side terminal 90 received through the network IF 150. Subsequently, the copy generating unit 170 copies the packet for the (preset) number of connected Aps, and transmits the copied packets to the wireless LAN IF 230. The wireless LAN IF 230 sends out the respective packets to a plurality of established wireless LAN links, to thereby wirelessly transmit the uplink packet to the two APs 130*c* and 130*d*.

These two packets are received at the layer 2 switch 20 through separate paths via the two APs 130*c* and 130*d*. The layer 2 switch 20 sends the two packets, received through two paths via the network IF 350, to the selection processor 400.

The selection processor 400 checks the sequence number of the packets for the number of ports (in this case, two) corresponding to the same MAC address learnt by the network IF 350, and when two packets having the same sequence number are received, selects one of them, and sends the selected packet to the SN deleting unit 410. The SN deleting unit 410 deletes the sequence number from the packet input from the selection processor 400, and sends the packet to the network IF 350. The network IF 350 sends out the packet, from which the sequence number has been deleted, to the network terminal 110.

Thus, in the sixth embodiment, the layer 2 switch 20 is used to realize the diversity function only through the layer 2. Accordingly, in addition to the effect of the first embodiment, the processing time can be speeded up and at a low cost.

In the sixth embodiment, the layer 2 switch 20 cannot learn the MAC address until the layer 2 switch 20 receives an uplink signal from the STA 10, and hence, in this case, the layer 2 switch 20 transmits a downlink signal without copying the packet. Therefore, when the STA 10 moves to an area of another AP and handover occurs, under such a situation that only the downlink packets from the network terminal 110 are received by the STA 10 for a long time, the layer 2 switch 20 sends out the downlink packets only to the previous path, and cannot execute the diversity operation.

To avoid this problem, therefore, the STA 10 or the AP sends out a dummy packet for learning the MAC address of the STA 10, in the uplink direction to the layer 2 switch 20, upon establishment of the second association and thereafter.

INDUSTRIAL APPLICABILITY

The wireless LAN system according to the present invention is useful for a wireless LAN system applied to environments under bad wireless conditions, long distance transmissions, and high-speed accesses in trains or vehicles moving at a high speed.

The invention claimed is:
1. A wireless LAN system comprising:
a plurality of base stations;
a LAN terminal configured to be wirelessly connected to the base stations;
an IP terminal configured to be connected to an IP network; and
a diversity device connected to the IP network and configured to relay packet transmissions between the LAN terminal and the IP terminal via the IP network, wherein the LAN terminal includes
a first uplink packet processor configured to sequentially establish associations with a predetermined number of the base stations, and to transmit a plurality of uplink packets, which are identical to each other, to the diversity device in parallel via the base stations with which the associations have been established, such that each base station relays one of the uplink packets, the diversity device includes
- a second uplink packet processor configured to receive the uplink packets, select one of received uplink packets, and transmit the selected uplink packet to the IP terminal; and
- a first downlink packet processor configured to receive a downlink packet from the IP terminal, create a plurality of downlink packets, which are identical to each other, from the received downlink packet, and transmit the created downlink packets to the LAN terminal in parallel via the base stations with which the associations have been established, and the LAN terminal further includes
- a second downlink packet processor configured to receive the downlink packets from the diversity device via the base stations, select and output one of the received downlink packets.

2. The wireless LAN system according to claim 1, wherein the first uplink packet processor attaches an identical sequence number to each of the uplink packets to be transmitted;
- the second uplink packet processor selects an uplink packet from the received uplink packets with the identical sequence number, deletes the identical sequence number from selected uplink packet, and transmits the selected uplink packet to the IP terminal;
- the first downlink packet processor attaches an identical sequence number to each of the downlink packets to be transmitted; and
- the second downlink packet processor selects a downlink packet from the received downlink packets with the identical sequence number, deletes the identical sequence number from the selected downlink packet, and outputs the selected downlink packet.

3. The wireless LAN system according to claim 1, wherein the first uplink packet processor sets up an IP tunnel, packetizes the uplink packets to be transmitted as IP tunnel packets, and transmits the IP tunnel packets;
- the second uplink packet processor deletes the IP tunnel of the received IP tunnel packets, and then executes the selection;
- the first downlink packet processor sets up an IP tunnel, packetizes the downlink packets to be transmitted as IP tunnel packets, and transmits the IP tunnel packets; and
- the second downlink packet processor deletes the IP tunnel of the received IP tunnel packets, and then executes the selection.

4. The wireless LAN system according to claim 2, wherein the second uplink packet processor selects an uplink packet that is first received correctly, and disposes of all the uplink packets having the identical sequence number received thereafter; and
- the second downlink packet processor selects a downlink packet that is first received correctly, and disposes of all the downlink packets having the identical sequence number received thereafter.

5. The wireless LAN system according to claim 2, wherein the second uplink packet processor waits for a predetermined period of time to receive a plurality of the uplink packets having the identical sequence number, and selects one uplink packet out of the uplink packets having the identical sequence number that is received within the predetermined period of time; and the second downlink packet processor waits for a predetermined period of time to receive a plurality of the downlink packets having the identical sequence number, and selects one downlink packet out of the downlink packets having identical sequence number that is received within the predetermined period of time.

6. The wireless LAN system according to claim 2, wherein each of the plurality of base stations transmits to the diversity device at least one of a radio status and an error check result that are valid at the time of receiving the uplink packet from the first uplink packet processor;
- the second uplink packet processor selects one of the received uplink packets having the identical sequence number, and having at least one of good radio status and good error check result; and
- the second downlink packet processor selects one of the received downlink packets having the identical sequence number based on at least one of the radio status and the error check result at the time of receiving the downlink packet.

7. The wireless LAN system according to claim 3, wherein the diversity device is a home agent.

8. The wireless LAN system according to claim 3, wherein the diversity device is a layer 2 switch.

9. The wireless LAN system according to claim 8, wherein in the layer 2 switch, if identical MAC addresses are detected at a plurality of ports, the second uplink packet processor executes the selection and the transmission with respect to the uplink packets received at the ports, and the first downlink packet processor executes the transmission process with respect to the downlink packets received at the ports.

10. The wireless LAN system according to claim 9, wherein
after the association has been established, the LAN terminal or at least one of the plurality of base stations sends, in the uplink direction to the layer 2 switch, a dummy packet for learning the MAC address of the LAN terminal.

11. A diversity device applied to a wireless LAN system including a plurality of base stations, a LAN terminal configured to be wirelessly connected to the base stations, an IP terminal configured to be connected to an IP network, and the diversity device connected to the IP network and configured to relay packet transmission between the LAN terminal and the IP terminal via the IP network, wherein the LAN terminal includes a first uplink packet processor configured to sequentially establish associations with a predetermined number of the base stations, and to transmit a plurality of uplink packets, which are identical to each other, to the diversity device in parallel via the base stations with which the associations have been established, and a first downlink packet processor configured to receive a plurality of downlink packets, which are identical to each other, from the diversity device via the base stations, select and output one of received downlink packets, the diversity device comprising:
- a second uplink packet processor configured to receive the uplink packets via the base stations, select one of received uplink packets, and transmit the selected uplink packet to the IP terminal; and
- a second downlink packet processor configured to receive a downlink packet from the IP terminal, create a plurality of downlink packets, which are identical to each other, from received downlink packet, and transmit the created downlink packets to the LAN terminal in parallel via the base stations with which the associations have been established.

12. A LAN terminal applied to a wireless LAN system including a plurality of base stations, the LAN terminal configured to be wirelessly connected to the base stations, an IP terminal configured to be connected to an IP network, and a diversity device connected to the IP network and configured to relay packet transmission between the LAN terminal and the IP terminal via the IP network, wherein the diversity device includes a first downlink packet processor configured to receive a downlink packet from the IP terminal, create a plurality of downlink packets, which are identical to each other, from the received downlink packet, and transmit the created downlink packets to the LAN terminal in parallel via a predetermined number of the base stations with which associations have been established, and a first uplink packet processor configured to receive a plurality of uplink packets, which are identical to each other, from the LAN terminal via the wireless LAN base stations, select one of the received uplink packets, and transmit the selected uplink packet to the IP terminal, the LAN terminal comprising:

- a second uplink packet processor configured to sequentially establish the associations with the predetermined number of the base stations, and to transmit the plurality of uplink packets, which are identical to each other, to the diversity device in parallel via the base stations with which the associations have been established; and
- a second downlink packet processor configured to receive the plurality of the downlink packets from the diversity device via the base stations, select and output one of the received downlink packets.

* * * * *